Feb. 11, 1941.  P. W. KLIPSCH ET AL  2,231,013
ELECTRICAL PROSPECTING WITH ALTERNATING CURRENT
Filed Nov. 1, 1937

PAUL W. KLIPSCH
SAMUEL S. WEST
INVENTORS

BY Jesse P. Stone
Lester B. Clark
ATTORNEYS

Patented Feb. 11, 1941

2,231,013

UNITED STATES PATENT OFFICE 2,231,013

ELECTRICAL PROSPECTING WITH ALTERNATING CURRENT

Paul W. Klipsch and Samuel S. West, Houston, Tex., assignors to Esme E. Rosaire, Houston, Tex.

Application November 1, 1937, Serial No. 172,112

5 Claims. (Cl. 175—182)

This invention relates to prospecting for subsurface anomalies and buried deposits by causing a variable frequency alternating current to flow in a region of the earth's crust, and measuring the relative distortion at different frequencies.

An object of the invention is to provide means and methods with which to discover geological anomalies by measuring the anomalies detected in electric transmission through the earth's crust, wherein changes in phase shift and attenuation with respect to changes in frequency are measured and interpreted in terms of the sought geological anomalies.

Specifically, an object is to provide a method of exploration which comprises causing an alternating current to flow in the earth, detecting the potential produced by the current, measuring the phase angle of the detected potential with respect to the current, and observing the change in the phase angle as the frequency is varied. The invention likewise comprehends as an object the observation of the transmission loss or attenuation as the frequency is varied.

An object of the invention is to provide a method in which the depth of penetration of the current can be varied with fixed surface geometry of electrodes and cables.

Another object is to provide a method of prospecting in which the indications of the instruments will refer to a portion of the subsurface in a given fixed geometrical relation to the electrodes while the depth of penetration is changed.

Other objects will be evident from a study of the following description taken in connection with the drawing in which.

The method described herein is especially suitable for the location of discontinuities in the conducting strata of the earth and for determining the depth and slope of strata which have a conductivity differing from that of the surrounding media.

In the past some prospecting methods have employed an alternating current flowing through the earth between two electrodes embedded therein. Measurements for determining the location and nature of subsurface anomalies were made by means of search coils or test electrodes at varying distances from the region of current excitation. The current was of constant frequency and the position of the current electrodes was kept fixed, so the process of exploring of a certain small region consisted of moving the test circuit from place to place. Difficulties of interpretation arise from this arrangement because the spatial relation of the detection circuit to the generation circuit changes. As the test or detection circuit moves away from the generation circuit, the depth to which its indications refer becomes greater. Simultaneously, the sensitivity decreases with the increased distance, that is, the indications of the detection means become weaker and eventually become masked by electrical noise such as natural earth currents, and from man-made interference in the form of power line unbalances and ground currents.

This invention differs fundamentally from the prior art, in that the spatial relation between generation and detection circuits remains fixed, the varying depth of current penetration and significant depth of detector indication results from changes in frequency.

Figure 1:
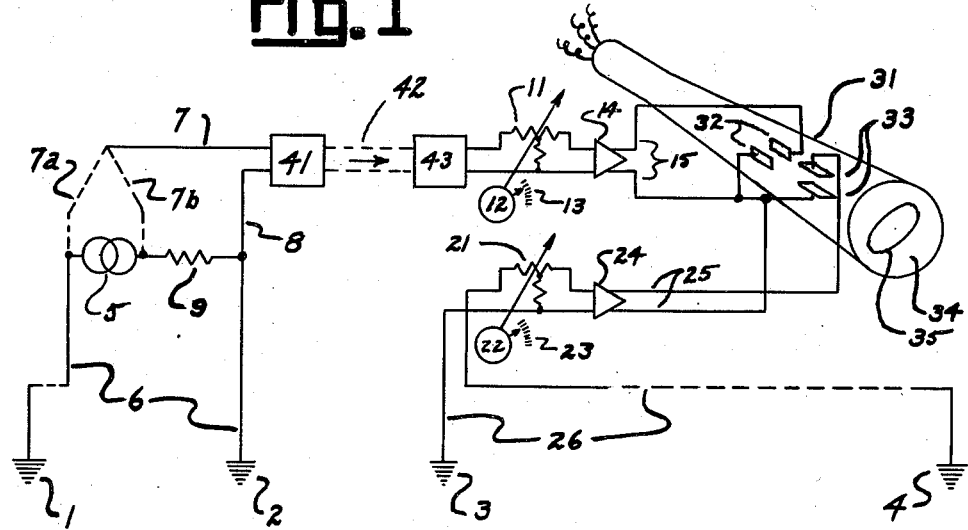
Fig. 1 is a diagram of one embodiment of the invention suitable for determination of both attenuation and phase angle variations with respect to frequency.

In Fig. 1, electrodes 1, 2, 3 and 4 are embedded in the earth at distances which remain fixed relative to each other during a series of observations. An alternating current source 5 of variable frequency causes current to flow between electrodes 1 and 2 and in a region of the earth's crust in their vicinity. The potential difference between electrodes 3 and 4 is conducted to a repeater 24 through lines 26, and is then indicated on a suitable instrument illustrated here as a cathode ray oscilloscope 31 with its fluorescent screen 34. The detected potential is applied to vertical deflecting plates 33. A calibrated attenuator 21 with control 22 and calibration scale 23 is inserted in the circuit so that a convenient amplitude occurs on the indicator. When the indicated amplitude is adjusted by attenuator 21 to a predetermined value, readings on scale 23 may be taken as an indication of attenuation of one location as compared to another. After a series of readings have been obtained for one position of the electrodes 1 to 4, the electrodes are removed to a new position for another series of observations. In this manner readings of attenuation at a number of stations can be obtained, studied and correlated.

For measuring relative transmission loss, the portion of the apparatus so far described is all that is necessary, save that a current intensity indicator and/or a voltage indicator should be included in the circuit of the generator 5.

For measuring the phase angle a comparison potential is necessary. Either the generated current or the generated voltage may be used as a basis for comparison. Leads 7 and 8 provide the comparison potential from the generator. If generator voltage is to be used, connection 7a is made and resistor 9 omitted; if generator current is used, connection 7b is made in place of 7a, so that the potential drop across resistor 9 is in phase with the current. A communication channel, such as a wire line illustrated as 42, or a modulated radio transmitter 41, and receiver 43, in which case 42 becomes a wave channel instead of a wire line, transmits the reference potential to the point of detection where it is suitably controlled through an attenuator 11 which is similar to the attenuator 21. The voltage output of the attenuator 11 is amplified in an amplifier 14 to a suitable voltage level to be impressed on the horizontal deflection plates 32 of the indicating device 31.

Figure 3:
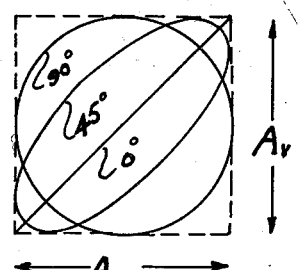
Fig. 3 illustrates Lissajous figures resulting from potentials of different phase angles being impressed on the different pairs of deflector plates of a cathode ray oscilloscope.

If the potential between the leads 25 is in phase with the potential between the leads 15, the picture produced on the cathode ray screen should be the straight line marked 0° in Fig. 3. A phase angle differing from zero results in an elliptical trace, traces for 45° and 90° being so marked in Fig. 3. Horizontal and vertical amplitudes $A_h$ and $A_v$, respectively, are under the control of the operator through the means of attenuators 11 and 21.

A certain amount of delay inherently exists in the amplifier and transmission channels. Care should therefore be exercised in the design and construction of the channel from the generator to the deflector plates 31 and of the channel between the electrodes 3, 4 and the deflector plates so that an equal phase lag or delay characteristics exist in these channels. In any event, such phase difference as does exist should be calibrated. Adjustment, calibration, and routine testing can be readily accomplished by impressing the same voltage simultaneously on leads 7—8 and leads 26.

Figure 2:
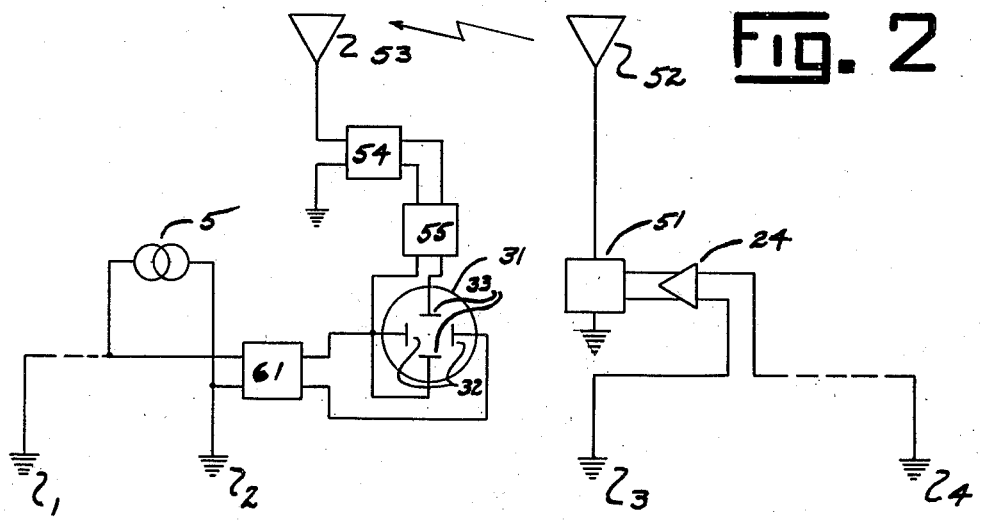
Fig. 2 shows another embodiment of the invention.

An alternative form of the invention is illustrated in Fig. 2 in which the detected potential is amplified in repeater 24 and then transmitted over communication channel here illustrated as radio transmitter 51, antennas 52 and 53, and receiver 54. Suitable controls and repeaters, such as 21 and 24 in Fig. 1, are provided and are indicated as 55 in this form of the invention. Similar control means shown as 61 provides a path for the comparison potential from the generator. The two potentials are impressed on the detector plates 32 and 33 of cathode ray tube 31.

It is believed apparent that, if desired, a phase meter or power factor meter may be used in the stead of the cathode ray tube 31 of Figs. 1 and 2. An advantage of the cathode ray oscilloscope over other indicating means, such as a phase meter or adapted power factor meter is that extraneous currents, such as power line interference which might result in spurious results with a meter become evident visually with the oscilloscope. When such interference occurs it shows up as a motion of the image on the fluorescent screen. When observed, remedial measures may be applied, such as making a small change in electrode geometry, or the observer may mentally make an average of what the oscilloscope shows, and thereby deduct the fluctuating or unwanted part, arriving at a good approximation of the steady or wanted part of the indicated curve.

Where attenuation alone is to be measured, ignoring the phase angle, the channel from the generator and terminating in deflector plates 31 may be omitted, and means provided for measuring the generator voltage or current in a manner well known in the art. In such case the numerical ratio of detected potential to generator potential, or transmission loss, may be measured. Alternatively, if the generator current is measured, the ratio of detected potential to the generator current, or mutual impedance, may be measured. The transmission loss and mutual impedance are vectors, a condition implying the existence of a phase angle. In accordance with the procedure just described, these vectors are measured only in magnitude. However, the variation of either of these scalar quantities with change in frequency has been found to be significant of geological structure.

Interpretation of the data obtained by the means and method above described is based upon a comparison of the results obtained at different locations. Such comparison is preferably made by plotting a curve of transmission loss, or mutual impedance, from the data taken at each station or location and then comparing the frequency response of the earth at each station by comparing these graphs. A family of curves showing the loss at different frequencies as ordinates with the distance along the profile as the abscissa has proved to be valuable in showing at a glance the location and nature of subsurface anomalies.

The principle of operation of the present invention is the same as that exemplified by the well known skin effect of current flowing in wires where the current of low frequencies penetrates deeper into the wires than does the current of high frequencies. By analogy, the current of a few hundred cycles does not penetrate deeply into the earth but furnishes data indicative of subsurface conditions relatively near the surface. Lower frequencies penetrate deeper into the earth, and from a comparison of the characteristics of the earth at different frequencies and at different locations at least qualitative conclusions can be drawn as to the nature of the deeper subsurface structures.

By way of further explanation it may be noted that, as is well known, skin effect is the phenomenon in which the current density of an alternating current flowing parallel to the surface of a conductor is proportional to the exponential of the product of a negative number, the distance from the surface, and the square root of the frequency. Hence the current density decreases very rapidly as the distance from the surface increases, and at a given distance from the surface it also decreases as the frequency increases. In the earth the same phenomenon occurs in the case of current flowing between two electrodes at the surface. Here conditions are more complicated because the current is parallel to the surface only in a limited region, and the earth is not homogeneous. Inhomogeneities cause a distortion in the distribution of current density, which becomes detectible by the changes in the potential difference between the test electrodes. The lower the frequency, the deeper is the penetration of the current into the earth. Thus, structures or anomalies at a considerable depth will only begin to exhibit their effects at some given frequency but will become more noticeable at lower frequencies. From these considerations one can compute at least approximately the depth of the inhomogeneity.

The penetration of the current is limited only by the fact that the current distribution approaches that for direct current as the frequency is decreased. Because of this limit, still deeper penetration must be obtained by moving the electrodes further apart. It is desirable, however, to keep the shortest distance between a test electrode and a current electrode at least as great as the distance between the current electrodes, since the influence of the deeper part of the current is a larger portion of the total effect at greater distances from the region of intense current flow.

Since a complex wave form can be decomposed into component sinusoidal waves of various frequencies either mathematically by means of harmonic analysis or electrically by means of suitable filter circuits, it is evident that the results obtained with the form of the invention which has been described above can also be obtained by utilizing a generator 5 having a complex wave form with a known content of each harmonic. Then the alternating potential developed between electrodes 3 and 4 can be analyzed for the amplitude of each of the harmonics in the original current wave form, and the totality of these amplitudes yields the same information that is obtained when each frequency is used separately.

For the purpose of definition, particularly in the appended claims, the term frequency distortion is taken to mean the relative attenuation and/or the phase shift at different frequencies. Relative attenuation of the detected potential with respect to the generated current may be more accurately termed the relative change in mutual impedance. Since impedance is a vector, the presence of the phase angle is implied. For rapid reconnaissance work, where the relatively complicated means of Fig. 1 and its method of use, would be cumbersome and slow, the omission of the reference potential circuit still permits measurement of the magnitude only of the mutual impedance or the relative attenuation.

What is claimed as new is:

1. The method of exploration for subsurface structure comprising causing an alternating electrical current to flow in the earth, detecting the potential between points subject to the influence of said current, varying the frequency of said current, and at several frequencies measuring the transmission loss in terms of mutual impedance from which the frequency distortion may be computed.

2. The method of exploration for subsurface anomalies comprising causing an alternating current composed of several superposed frequency components of known amplitudes to flow in the earth, detecting the potential between points subject to the influence of said current, and measuring the amplitudes of the various frequency components of the detected potential.

3. Apparatus for geophysical exploration comprising means for causing an alternating current to flow in the earth, means for varying the frequency of said current, means for detecting the potential between points subject to the influence of said current and means for measuring the transmission loss of the earth at a plurality of frequencies.

4. Means for geophysical prospecting comprising means for generating an alternating current of known amplitude, means for causing said current to flow in a region of the earth's crust, means for detecting the potential between points subject to the influence of said current, and means for measuring the transmission loss between said generating and detecting means.

5. The method of exploration for subsurface structural anomalies comprising the steps of causing an alternating electrical current to flow in the earth, detecting the potential between points subject to the influence of the current, repeating the test at a plurality of frequencies, measuring the transmission loss at each of the test frequencies in terms of the mutual impedance of the current and detection paths, repeating the group of measurements at a plurality of stations, and determining the frequency distortion at each station for the respective frequencies as indications of the location and extent of subsurface anomalies.

SAMUEL S. WEST.
PAUL W. KLIPSCH.